United States Patent Office 2,802,757
Patented Aug. 13, 1957

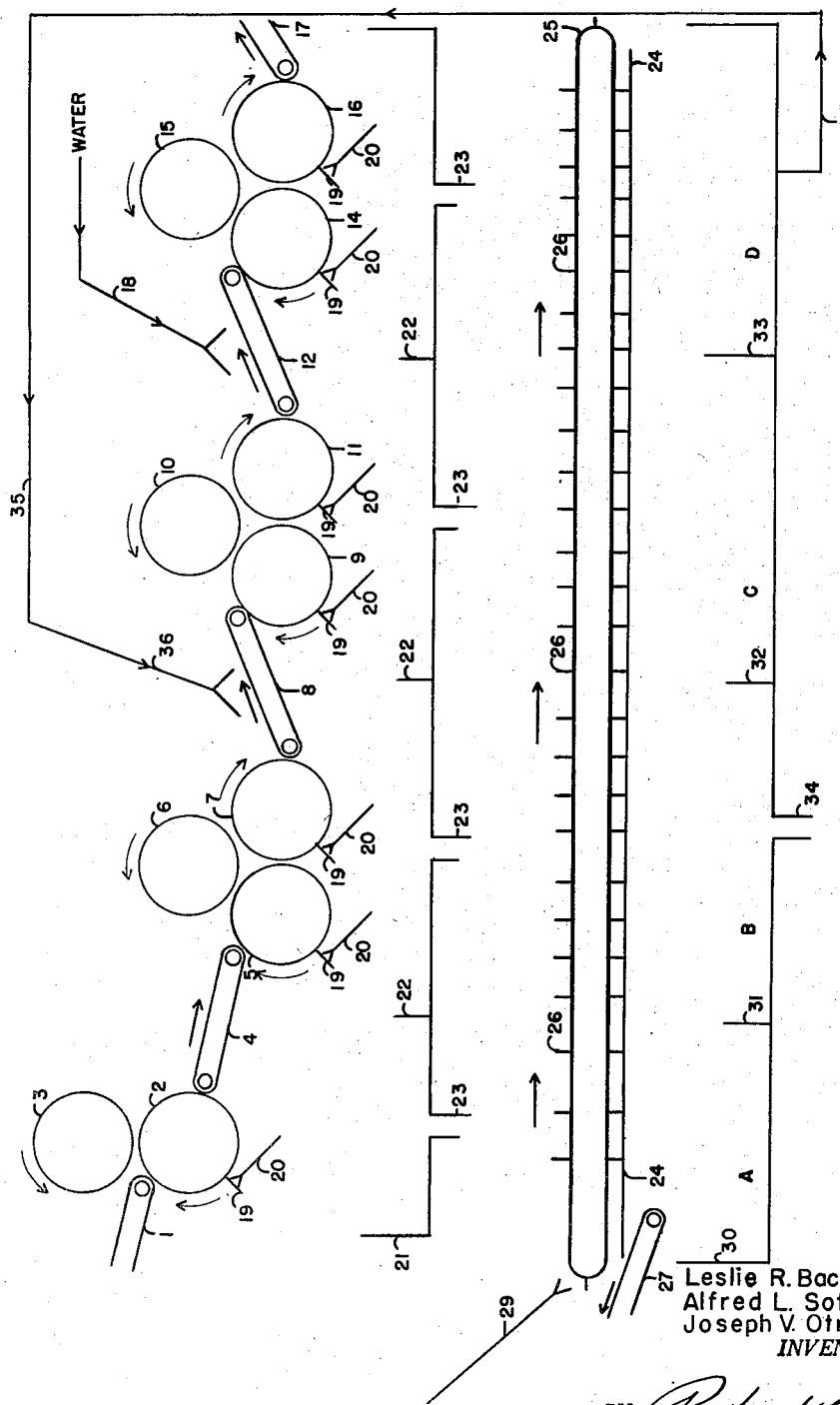

2,802,757

METHOD OF CONTROLLING SLIME IN SUGAR MILLS

Leslie R. Bacon, Wyandotte, Joseph V. Otrhalek, Dearborn, and Alfred L. Sotier, Wyandotte, Mich., assignors to Wyandotte Chemicals Corporation, Wyandotte, Mich., a corporation of Michigan Application September 4, 1953, Serial No. 378,492

6 Claims. (Cl. 127—44)

The present invention relates to a method of reducing sucrose losses in sugar manufacture.

Sucrose syrups and common table sugar are obtained commercially by extracting sucrose from sacchariferous plants such as sugar cane, sugar beets, sorghum and the maple tree. The sucrose is obtained from the sacchariferous plant as a crude, dilute aqueous solution by diverse means appropriate to the source. In any case this impure, dilute sucrose solution is an ideal nutrient for many microorganisms such as bacteria, yeasts and fungi which inevitably contaminate it. The resultant growth and multiplication of such contaminating microorganisms, usually under favorable conditions, entails serious economic losses, since at least certain of such organisms directly utilize and destroy sucrose in their metabolism, and some directly or indirectly convert sucrose to products which have little or no economic value. This invention will be described with particular reference to the cane sugar industry to which it is especially applicable, but its application is not restricted thereto.

Although the problem of economic losses from microorganism contamination has been a long standing one in the art of extracting sucrose from sugar cane, no satisfactory solution has been forthcoming. Good sanitation practices such as frequent flushing or periodic steam cleaning of the mills, etc., are of some value, but the sugar juice is an ideal growth medium and the juice solution is continuously infected as produced by organisms inherently present in the sugar cane. It has been suggested that the bacteria counts of the sugar juice be controlled by adding thereto dilute chlorine water. While this practice may control the bacteria counts to a limited degree, chlorine water is highly corrosive and damages the mill equipment such as rolls, holding tanks, pipes and the mill structure itself. All things considered, the sucrose savings obtained are not sufficient to justify this use of chlorine and the practice where adopted is being widely discontinued. In fact, our work (see Example 1, part B) indicates that bacteria have only a minor, if any, direct effect in causing sucrose losses.

In order to understand and appreciate the manner in which the herein described process eliminates or substantially reduces sucrose losses, it is essential to understand the manner in which sucrose is extracted from the sugar cane. In a typical operation, sugar cane is first cut and shredded into small particles and then passes through a two-roll crusher and a series of three-roll mills where tremendous pressure is exerted on the cane and raw sugar juice is extracted. This cane sugar juice is collected in shallow pans normally situated under the rolls. From the collecting pans the juice flows by gravity to juice troughs which conduct the juice to screens which filter out gross solid particles. After passing through the screens, the juice flows or is pumped to juice holding tanks, from which it is fed to liming tanks, where milk of lime is added. When the limed juice leaves the liming tanks, it is heated to boiling temperatures, whereby most but not all the microorganisms present are killed.

During the operation of the mill, small particles of bagasse (the cellulosic residue of the cane) and unsqueezed cane fall into the cane juice. After a short period of operation, the juice collecting system fills with this soggy material. Workmen with long-handled rakes and scrapers constantly remove this bagasse to provide open channels for the flow of the juices. Invariably, certain parts of the mill equipment are difficult to reach with such equipment and small stagnant masses of bagasse and juice build up at inaccessible places. In the long periods of continuous operation in which effective cleaning is impractical, conditions are ideal for growth of the microbiological population and concentration of metabolic products within these masses. Such accumulations are the sites of fermentation and souring which lead to the development of slime-like masses.

We have discovered that these slimes and their extracts or drainage materials cause very serious sucrose losses when incorporated into cane juice or into pure sucrose solutions. Despite all precautions that may be taken, certain quantities of these materials inevitably fall into the juice stream and become a major cause of the sucrose losses that are encountered in milling operations.

The present invention is based upon our further discovery that such slimes can be deactivated or converted to an innocuous form by contacting the slime or its extracts with a small amount of an aqueous solution containing a high concentration of available halogen, preferably chlorine, although bromine and iodine are also operable in the practice of the invention. In commercial practice, sucrose losses are materially reduced simply by spraying the sites of slime development with the chlorine containing solution. A critical feature of the invention resides in the fact that the slimes must be directly contacted with the chlorine containing solution continuously or at frequent intervals. When an equivalent quantity of available chlorine is added to a sugar solution in which an active slime has been dispersed, no appreciable saving of sucrose is effected. Thus, addition of the chlorine containing solution to the water added to the mills, or to juice expressed from the cane is not effective.

To illustrate the principle and practice of the invention, several laboratory experiments have been carried out. All of the laboratory experiments were designed to correlate with actual mill experience and were based upon two fundamental premises:

1. The average time cycle from the time when the cane enters the mill until the extracted juice enters the liming tank is less than 1 hour.

2. A laboratory treatment that will prevent substantial sucrose losses over a three hour period includes an adequate safety factor and will be effective in actual mill practice.

All of the examples to be cited were carried out employing either a sugar solution prepared from commercial cane sugar purchased on the open market or samples from a single lot of cane juice that was obtained from a sugar mill. Immediately after the cane juice was collected, the samples were frozen at −30° C. and stored at temperatures well below freezing until thawed for use. The juice that was stored in this manner showed no measurable increase in bacteria count or decrease in sucrose content over a period of six months. The slime that was used in the examples was taken from a commercial sugar mill. As in the case of the cane juice, the slime was frozen and stored at similar low temperatures until thawed for use.

EXAMPLE 1

Part A

This experiment shows the deleterious effect that mill slimes have in causing sucrose losses. A pure sucrose solution was prepared by dissolving 120 grams of commercial cane sugar in 1000 ml. of demineralized water. The resulting solution contained 10.78 sucrose. Four grams of a mill slime was added to a 200 ml. aliquot of this solution and allowed to age for 16 hours at 84° F. At the end of this period, the sucrose content had decreased to 2.15%, indicating that about 80% of the original sucrose had been destroyed. A control aliquot of this sugar solution lost none of its sucrose content upon being aged under identical conditions.

Part B

Two additional aliquots of the sugar solution prepared in part A were inoculated with, respectively, rod and coccus forms of Leuconostoc type bacteria that were taken from actively growing slants of these organisms. The inoculated samples were aged for 16 hours at 84° F. and after this treatment had lost none of their original sucrose content. These data indicate that bacteria, at least the Leuconostoc species which often predominate in cane juice, are not of direct importance in causing sucrose losses.

Part C

An additional experiment was run to establish that some component other than the mere presence of bacteria was the active component of the slime that caused the sucrose losses of part A. A sterile extract of the slime used in part A was prepared by adding 8 grams of frozen slime to 50 ml. of water and filtering the solution through a sterile Seitz filter to remove all bacteria therefrom. The Seitz filter disc used had a pore size of 0.1 micron, which disc will remove even small coccus bacteria. It was established in fact by plating that the effluent was sterile. A total of 37.5 ml. of the sterile slime extract was added to a 200 ml. portion of a sucrose solution that had been autoclaved to insure sterility. The initial sucrose content of the resulting sample was 9.2%. After aging for 16 hours at 82° F. under sterile conditions, the sucrose content had fallen to 8.8% which is sufficient to indicate that the slime contained active, soluble, filterable components other than the bacteria, and such components caused loss of sucrose. The lower activity of the extract as compared to the whole slime may be attributed to adsorbtion of much of the active components within the filter mass and retention within the slime mass itself.

EXAMPLE 2

Example 1 demonstrates that a sugar mill slime or a sterile extract thereof will cause serious sucrose losses. Example 2 demonstrates that the active component of the slime or its sterile extract can be deactivated by treatment with an aqueous solution containing a high concentration of available chlorine.

Part A

Two aliquot portions of a sterile slime extract (prepared as described in Example 1, part C) were placed in sterile test tubes except that a special effort was made to obtain an extract of the highest possible activity. To one of the aliquots was added a solution containing 150 p. p. m. of 1,3-dichloro-5,5-dimethylhydantoin. The quantity of 1,3-dichloro-5,5-dimethylhydantoin added to the sterile slime extract was such that a sucrose solution seeded with this preparation later contained 40 p. p. m. of the compound. The sterile slime extract and the 1,3-dichloro-5,5-dimethylhydantoin solution were allowed to stand for 20 minutes with occasional shaking and were then transferred to a flask containing a sterile sucrose solution. A control solution was prepared by adding the aliquot of untreated sterile slime extract to a sterile sucrose solution of the same concentration. Both solutions were aged for 16 hours at 82° F. and were then analyzed for sucrose content. The initial sucrose content, the sucrose content at the end of the experiment and the loss of sucrose, expressed as a percentage of the original sucrose content, are shown in Table I below:

TABLE I

| Sample | Sucrose Content | | Sucrose Loss, Percent Original Content |
|---|---|---|---|
| | Initial | Final | |
| Untreated Slime Extract | 8.12 | 7.69 | 5.3 |
| Treated Slime Extract | 8.12 | 8.10 | 0.2 |

In examining the data of Table I, it is noted that the untreated slime extract caused a loss of 5.3% of the sucrose originally present in the solution. The remarkable decrease in sucrose loss attendant with treating the slime extract with an aqueous solution containing a high concentration of available chlorine (furnished by the 1,3-dichloro-5,5-dimethylhydantoin) is evidenced by the fact that only 0.2% of the original sucrose was lost.

Part B

To establish that the available chlorine of the 1,3-dichloro-5,5-dimethylhydantoin compound was responsible for deactivating the slime extract, part A was repeated except that an equivalent quantity of 5,5-dimethylhydantoin was substituted for the 1,3-dichloro-5,5-dimethylhydantoin. In this experiment, the sucrose loss was identical with that experienced in the control. This result demonstrates that available chlorine is responsible for deactivating the slime extract.

EXAMPLE 3

To establish that the source of available chlorine is not critical in deactivating the sterile slime extract, Example 2, part A was repeated except that the 1,3-dichloro-5,5-dimethylhydantoin was replaced by an equivalent quantity (on an available chlorine basis) of sodium p-toluene-sulfonchloramine. In this case, the sucrose solution that had been inoculated with the treated sterile slime extract showed no sucrose loss upon standing for 16 hours at 82° F., whereas the control containing the untreated sterile slime extract again showed a loss of approximately 5% of its sucrose content.

Comparable results were obtained when the sodium p-toluenesulfonchloramine was substituted with a proprietary composition comprising approximately 35% sodium bicarbonate and 65% sodium p-toluenesulfonchloramine. Equivalent results were also obtained with a proprietary composition containing 25% 1,3-dichloro-5,5-dimethylhydantoin.

Example 1 has shown that mill slimes cause sucrose losses in pure sucrose solutions. The following experiments were designed to show the degrading effect of sugar mill slimes on a mixed cane juice obtained directly from a sugar mill. As noted earlier herein, the cane juice was held frozen until used. To assured reproducible results, a standard procedure was adopted for thawing the frozen juice. A sample of the frozen juice was taken from the storage can, pulverized in an ice crusher and warmed to room temperature in a water bath at 100° F.

EXAMPLE 4

Part A

Two samples of mixed cane juice were thawed as described in the paragraph above. To one of the samples was added 0.5% of a mill slime. The two samples were aged at 86° F. and the sucrose contents were measured periodically. The results are shown in Table II below:

TABLE II

| Sample | Time, Hours | Sucrose Content, Percent | Sucrose Loss, Percent Original Content |
|---|---|---|---|
| Control—Cane Juice, No Slime Added | 0 | 9.97 | 0 |
| Do | 0.17 | 9.97 | 0 |
| Do | 0.5 | 9.97 | 0 |
| Do | 1.0 | 9.94 | 0.3 |
| Do | 2.0 | 9.92 | 0.5 |
| Do | 3.0 | 9.89 | 0.8 |
| Cane Juice and 0.5% Slime | 0 | 9.97 | 0 |
| Do | 0.17 | 9.89 | 0.8 |
| Do | 0.5 | 9.81 | 1.6 |
| Do | 1.0 | 9.62 | 3.5 |
| Do | 2.0 | 9.24 | 7.3 |
| Do | 3.0 | 8.73 | 12.4 |

The great enchancement and serious magnitude of the losses caused by mill slime are clearly demonstrated by the above table. It will be noted that the losses suffered in the control cane juice were relatively minor and constituted only 0.8% of the original sucrose content after three hours. When the cane juice was inoculated with the mill slime, however, the losses became very severe and amounted to 12.4% of the original sucrose content after 3 hours.

Part B

Having shown that mill slimes cause serious sucrose losses in juice, this experiment is cited to demonstrate that treatment of the slime with an aqueous solution containing a high concentration of available chlorine will deactivate the slime and reduce the sucrose losses. A control solution was prepared by adding 0.5% of a mill slime to thawed cane juice. A second sample was prepared by adding 0.5% of a slime to the thawed cane juice, after the slime had been pretreated with an aqueous solution containing a high content of available chlorine. The slime was treated with a solution containing 3000 p. p. m. of a proprietary product which consisted of 65% sodium p-toluene-sulfonchloramine and 35% sodium bicarbonate. The quantity of treating solution added to the slime was such that the final juice solution contained 15 p. p. m. of the proprietary product. The slime and chlorine containing solution were allowed to stand together for 30 minutes before being added to the cane juice. The two samples were aged at 30° C. and their sugar contents were analyzed at frequent intervals. The results are shown in Table III below:

TABLE III

| Column No. | 1 | 2 | 3 | 4 | 5 |
|---|---|---|---|---|---|
| Time, Hours | Sucrose Content Control Solution | Sucrose Loss, Percent Original Content, Control Solution | Sucrose Content Treated Slime | Sucrose Loss, Percent Original Content, Treated Slime | Percent Original Sucrose Saved by Slime Treatment |
| 0 | 10.36 | 0 | 10.36 | 0 | 0 |
| 0.17 | 10.26 | 0.97 | 10.30 | 0.58 | 0.39 |
| 0.5 | 10.11 | 2.4 | 10.26 | 0.97 | 1.4 |
| 1.0 | 9.97 | 3.7 | 10.23 | 1.2 | 2.5 |
| 2.0 | 9.64 | 6.9 | 10.16 | 1.9 | 5.0 |
| 3.0 | 9.37 | 9.5 | 10.04 | 3.1 | 6.4 |

In the above table, column 1 shows the sugar content of the control solution that was inoculated with the untreated slime. Column 2 shows the sucrose losses, as a percent of the original sucrose content, that were suffered by inoculating the juice solution with the untreated slime. Column 3 shows the sugar content of the solution that was inoculated with the treated slime. Column 4 shows the sucrose losses, as a percent of the original sucrose content, of the solution that was inoculated with the treated slime. It will be noted that after any given period of time the loss suffered in the solution that was inoculated with the treated slime was much smaller than the corresponding loss suffered in the solution which was inoculated with the untreated slime. The values of column 5 are obtained by subtracting the value of column 4 from the value of column 2 and represent the savings in sucrose, expressed as a percent of the original sucrose content of the solution, that were obtained by treating the slime with the aqueous solution contaning the high concentration of available chlorine. It will be noted that after any given period of time a very substantial savings in sucrose was obtained by treating the slime and this savings amounted to 6.4% of the original sucrose after 3 hours.

Comparable results were obtained when this example was repeated except that the chlorine containing solution was obtained by dissolving liquid chlorine in demineralized water. Comparable results were also obtained when the slime was treated with a solution containing both available chlorine and available iodine. This treating solution was prepared by adding a small quantity of potassium iodide to an aqueous solution containing sodium p-toluenesulfonchloramine.

A critical feature of this invention is that the sucrose-destroying slime must be directly contacted with the aqueous solution containing a high concentration of available chlorine. When Example 4 was repeated, except that the cane juice was inoculated with the untreated slime and the chlorine containing solution then added, no sucrose savings was effected.

EXAMPLE 5

To effectively deactivate the sucrose destroying power of the slimes, it is necessary to contact the slime with an aqueous solution containing a high concentration of available chlorine. To illustrate the effect of available chlorine concentration on slime deactivation, several samples of thawed frozen cane juice were inoculated with 0.5% of mill slimes that had been treated for 30 minutes with aqueous solutions containing varying concentrations of available chlorine.

The chlorine containing solutions used to deactivate the slimes were prepared by dissolving, respectively, 0.1%, 0.2% and 0.4% of a proprietary chlorine-liberating composition in deionized water. The chlorine-liberating composition contained 16% available chlorine and consisted of 65% sodium p-toluene-sulfonchloramine and 35% $NaHCO_3$. Thus, the aqueous chlorine solutions contained, respectively, 160, 320 and 640 p. p. m. of available chlorine. In each case, however, the total volume of aqueous solution added to the slime was adjusted so that the available chlorine content in the final cane juice was 5 p. p. m. The composition of the chlorine containing solution and the final juice solution is set forth in Table IV below:

TABLE IV

| | Control | Sample No. | | |
|---|---|---|---|---|
| | | A | B | C |
| Sample Composition—Percent By Weight: | | | | |
| Cane Juice | 99.0 | 99.0 | 99.25 | 99.375 |
| Mill Slime | 0.5 | 0.5 | 0.5 | 0.5 |
| Deionized Water | 0.5 | | | |
| Chlorine Containing Solution | | 0.5 | 0.25 | 0.125 |
| Chlorine Containing Solution Composition—Percent By Weight: | | | | |
| Deionized Water | | 99.9 | 99.8 | 99.6 |
| Chlorine Liberating Agent [1] | | 0.1 | 0.2 | 0.4 |
| Parts Per Million Available Chlorine in Juice | | 0.8 | 0.8 | 0.8 |
| Parts Per Million Available Chlorine in Chlorine Containing Solution | | 160 | 320 | 640 |

[1] Proprietary mixture 65% sodium p-toluenesulfonchloramine and 35% $NaHCO_3$.

The control solution and samples A, B and C of Table IV were aged at 30° C. and the sucrose content was analyzed periodically. The results are set forth in Table V below:

available to deactivate the sucrose destroying components of the mill slime. As would be expected, the concentration level of available chlorine required is dependent upon the composition of the particular slime being treated. It

TABLE V

| Time, Hours | Control | | Sample No. | | | | | | | | |
|---|---|---|---|---|---|---|---|---|---|---|---|
| | | | Sample A | | | Sample B | | | Sample C | | |
| | Sucrose Content, Percent | Sucrose Loss, Percent Original Content | Sucrose Content, Percent | Sucrose Loss, Percent Original Content | Percent Original Sucrose Saved by Treatment | Sucrose Content, Percent | Sucrose Loss, Percent Original Content | Percent Original Sucrose Saved by Treatment | Sucrose Content, Percent | Sucrose Loss, Percent Original Content | Percent Original Sucrose Saved by Treatment |
| 0 | 10.43 | 0 | 10.43 | 0 | 0 | 10.43 | 0 | 0 | 10.46 | 0 | 0 |
| 0.17 | 10.38 | 0.5 | 10.43 | 0 | 0 | 10.43 | 0 | 0.5 | 10.46 | 0 | 0.5 |
| 0.5 | 10.20 | 2.2 | 10.11 | 3.1 | 0 | 10.38 | 0.5 | 1.7 | 10.38 | 0.8 | 1.4 |
| 1.0 | 9.87 | 5.4 | 9.87 | 5.4 | 0 | 10.11 | 3.1 | 2.3 | 10.18 | 2.7 | 2.7 |
| 2.0 | 9.42 | 9.7 | 9.49 | 9.0 | 0.7 | 9.72 | 6.8 | 2.9 | 9.84 | 5.9 | 3.8 |
| 3.0 | 8.93 | 14.4 | 9.03 | 13.4 | 1.0 | 9.29 | 10.9 | 3.5 | 9.37 | 10.4 | 4.0 |

In the above table, the sucrose saved by the slime treatment is determined by subtracting the percentage sucrose loss (based on original content) of the solution containing the treated slime from the sucrose loss of the control. For convenience in interpreting the data, the actual sucrose saving are retabulated in VI:

TABLE VI

| Sample | A | B | C |
|---|---|---|---|
| Concentration Chlorine Containing Solution p. p. m. Available Chlorine | 160 | 320 | 640 |
| Time, Hours | Sucrose Saving Over Control, Percent of Original Sucrose Content | | |
| 0.0 | 0 | 0 | 0 |
| 0.17 | 0 | 0.5 | 0.5 |
| 0.50 | 0 | 1.7 | 1.4 |
| 1.0 | 0 | 2.3 | 2.7 |
| 2.0 | 0.7 | 2.9 | 3.8 |
| 3.0 | 1.0 | 3.5 | 4.0 |

It will be noted that the treatment of the slime in sample A had only a slight effect in deactivating the sucrose destroying power of the slime and this effect only appeared after an aging period of 2 hours. On the other hand, the treatment of the slimes incorporated in samples B and C effected very substantial sucrose savings which were noted after a period of only 0.17 hour. It will be further noted that more sucrose was saved in sample C than sample B. These results demonstrate that the concentration of available chlorine in the chlorine containing solution used to treat the slime is important and that an available chlorine concentration in excess of 160 p. p. m. is required to deactive the particular slime used in this example.

While it is noted in the above example that the concentration of available chlorine in the treating solution is important, it is impossible to set a prescribed mathematical lower limit that will be valid under all of the many diverse operating conditions met in practicing the invention. The lower concentration limit required will depend somewhat upon the total quantity of chlorine containing solution used to treat the slime and especially upon the activity and composition of the slime being treated. From the description of the manner in which mill slimes develop it is obvious that they will vary widely in activity and composition and the composition of the slime is much more important than would be normally apparent. The bagasse and certain additional components of sugar cane have a strong chemical affinity for chlorine, which is possibly used to chlorinate unsaturated and/or other chemical groups. The net effect is that this chlorine requirement must be met before any residual chlorine is has been established that a solution containing 200 p. p. m. available chlorine will be operable against most mill slimes, however, in some cases it is preferred to use concentrations of 300 p. p. m. or even higher.

In addition to the concentration of available chlorine in the chlorine containing solution, the total quantity of available chlorine employed (effectively the volume of chlorine containing solution) is also important. To a large extent the quantity of chlorine containing solution required is directly proportional to the volume of the slimes that accumulate on the mill. The smaller the build up and volume of slimes, the smaller the volume of chlorine containing solution required. With sugar mills that operate with good sanitation practices, a quantity of available chlorine equivalent to about 1.0 part per million (calculated on the basis of cane juice produced) is generally required. Optimum economic savings are usually obtained at an ultimate chlorine level of 2.0 parts per million or higher.

In actual practice the selection of the optimum concentration of available chlorine to be employed in the aqueous solution together with the total quantity of available chlorine to be used can be readily determined by routine experimentation. One half percent, by weight, of the slime to be deactivated is used to inoculate a 10% solution of sucrose in distilled or deionized water. The inoculated sample is maintained at 30° C. for three hours and the sucrose concentration then determined. The loss of sucrose, as a percent of the original sucrose content, is calculated and recorded. In the appended claims the ability of a slime to destroy sucrose is referred to as an "infection factor" and is numerically equal to the loss of sucrose, expressed as a percent of the original content, suffered when the slime is tested as described in this paragraph.

As a minimum objective, the volume and available chlorine concentration of the aqueous solution used to deactivate the slime should be sufficient to reduce the "infection factor" of the slime by at least 10% for a period of at least three hours. The volume and available chlorine concentration required to obtain this objective may be determined as follows:

The "infection factor" of the slime of interest is determined as above described. Six samples of slime are placed in sterile test tubes and an equal weight of an aqueous available chlorine containing solution is added to the slime samples, the aqueous solutions containing, respectively, 100, 200, 300, 400, 500 and 750 parts per million available chlorine. The samples of slime and aqueous chlorine containing solution are allowed to stand for thirty minutes with periodic shaking. At the end of this period, the treated slimes are used at a level of one half percent to inoculate 10% sucrose solutions in distilled or deionized water. The inoculated samples are maintained at 30° C. for three hours and the "infection factors" of the treated slimes are determined by calculating the sucrose losses of the solutions as a percent of the original sucrose content. Comparison of the "infection factors" of the treated slimes with the untreated control will indicate the concentration of available chlorine required to reduce the "infection factor" of the slime by at least 10%. Having determined the concentration of available chlorine required in the treating solution, the total volume of solution required in treating the slime is readily determined by simply treating the slime with varying proportions of the solution and determining the "infection factor" of the treated slimes.

A preferred method of carrying out the process of this invention on a commercial sugar mill is illustrated by the figure. Cut and shredded sugar cane is delivered by conveyor 1 to roll 2 and is crushed by passing between rolls 2 and 3. The crushed cane from roll 2 is delivered by conveyor 4 to a three-roll mill which consists of rolls 5, 6 and 7 rotating in the directions indicated. The cane which is discharged from roll 7 is delivered to a second three-roll mill consisting of rolls 9, 10 and 11 by conveyor 8. While on conveyor 8, the partially extracted cane is sprayed with dilute cane juice from distributor 36. After passing through the second mill the partially extracted cane is transferred to a third three-roll mill consisting of rolls 14, 15 and 16 by conveyor 12. While on conveyor 12, the partially extracted cane is sprayed with water from distributor 18. The crushed cane which is discharged from roll 16 has had its sucrose content reduced to a low level and is conveyed to a disposal area by conveyor 17.

Scraping fingers or knives 19—19 are provided on the undersides of rolls 2, 5, 7, 9, 11, 14 and 16 to remove any cane that adheres to the rolls and is not discharged onto conveyor belts 4, 8, 12 and 17. Aqueous solutions containing a high concentration of available chlorine are sprayed onto the cane that is removed by scraping knives 19—19 to deactivate any slimes that accumulate thereon.

The sugar solutions that are extracted in the crusher and the mills, together with the cane that is removed by scraping knives 19—19, are collected in juice collecting tank 21. Juice collecting tank 21 is divided into four compartments by internal dividing walls 22—22. The juice from tank 21 is discharged through outlets 23—23 and is filtered through a slotted screen 24 to separate the coarser cane solids from the juice. Endless conveyor 25 rotates in the direction indicated and has paddles 26—26 which remove the solid cane residues from screen 24 and discharge same onto conveyor 27. An aqueous solution containing a high concentration of available chlorine is sprayed upon conveyor 25 and paddles 26—26 by sprayer 29. The sugar solutions passing through screen 24 are held in juice holding tank 30. Holding tank 30 is divided into compartments A, B, C and D of uneven depth by means of internal dividing walls 31, 32 and 33 which are arranged so that the liquid from compartments A, C and D will overflow into compartment B and drain through line 34 into weighing tanks not shown. A portion of the dilute juice from compartment D is recirculated through line 35 to furnish maceration juice which is sprayed onto the cane on conveyor 8. An aqueous solution containing a high concentration of available chlorine is sprayed on the slimes which accumulate on the underside of screen 24 by sprayers not shown.

While the specific examples herein set forth show the deactivation of sugar mill slimes with chlorine containing solutions wherein the available chlorine is furnished by 1,3-dichloro-5,5-dimethylhydantoin or sodium p-toluenesulfonchloramine, the available chlorine may be furnished by any known chlorine liberating compound. Thus, the sanitizing solution can be prepared from liquid chlorine (not favored because of corrosion problems), alkali metal and alkaline earth hypochlorites, sodium p-benzenesulfonchloramine, trichloromelamine, etc. Similarly, the bromine and iodine homologues of the above compounds may be employed.

What is claimed is:

1. In a process of preparing an aqueous sucrose solution from sacchariferous plants wherein said plants are crushed, said aqueous sucrose solution is thereby obtained, slimes are developed, and said process is carried out under conditions such that said sucrose solution is subject to infection for microorganisms, the improvement, which comprises, directly contacting said slimes with an aqueous solution containing, as the sole essential solute, at least 200 parts per million of an available halogen having an atomic weight from 35 to 127.

2. A process according to claim 1 wherein the halogen contained in the aqueous solution is chlorine.

3. A process according to claim 2 wherein the available chlorine in the aqueous solution is supplied by sodium p-toluenesulfonchloramine.

4. A process according to claim 2 wherein the available chlorine in the aqueous solution is supplied by 1,3-dichloro-5,5-dimethylhydantoin.

5. A process according to claim 2 wherein the available chlorine in the aqueous solution is supplied by an alkali metal hypochlorite.

6. A process according to claim 2 wherein the available chlorine in the aqueous solution is supplied by an alkaline earth hypochlorite.

References Cited in the file of this patent

UNITED STATES PATENTS 2,560,125    Pearson _____ July 10, 1951

OTHER REFERENCES

Sugar (I), November 1947, pp. 30, 31 and 48.
Sugar (II), January 1951, page 50.
McCulloch: Disinfection and Sterilization, Philadelphia, 1945, pp. 327–351.
Spencer-Meade: Cane Sugar Handbook, 8th edition, New York City, 1945, pp. 54–55.
McGinnis: Beet Sugar Technology, New York City, 1951, page 168.
Zeitschrift des ver der Deutschen Zucher Ind., vol. 79, Techn. T., 1929, pp. 463–469.
Zeitschrift des ver der Deutschen Zucher Ind., Bd. 81, Techn. T., 1931, pp. 595–604.